(12) United States Patent
Carlson et al.

(10) Patent No.: US 8,512,739 B2
(45) Date of Patent: Aug. 20, 2013

(54) USE OF LOW-GLYCEMIC SWEETENERS IN FOOD AND BEVERAGE COMPOSITIONS

(75) Inventors: Ting Liu Carlson, Dayton, OH (US); Anton Woo, Huber Heights, OH (US)

(73) Assignee: Cargill, Incorporated, Wayzata, MN (US)

(*) Notice: Subject to any disclaimer, the term of this patent is extended or adjusted under 35 U.S.C. 154(b) by 483 days.

(21) Appl. No.: 10/527,332

(22) PCT Filed: Sep. 11, 2003

(86) PCT No.: PCT/US03/28474
§ 371 (c)(1),
(2), (4) Date: Oct. 26, 2005

(87) PCT Pub. No.: WO2004/023894
PCT Pub. Date: Mar. 25, 2004

(65) Prior Publication Data
US 2006/0127448 A1 Jun. 15, 2006

Related U.S. Application Data

(63) Continuation of application No. 10/243,283, filed on Sep. 13, 2002, now abandoned.

(51) Int. Cl.
*A61K 47/00* (2006.01)
(52) U.S. Cl.
USPC ............................................. 424/439; 426/2
(58) Field of Classification Search
USPC ............................................. 424/439; 426/2
See application file for complete search history.

(56) References Cited

U.S. PATENT DOCUMENTS

| | | | |
|---|---|---|---|
| 2,726,190 | A | 12/1955 | Koepsell et al. |
| 3,701,714 | A | 10/1972 | Okada et al. |
| 3,703,440 | A | 11/1972 | Okada et al. |
| 3,705,039 | A | 12/1972 | Mitsuhashi et al. |
| 3,766,165 | A | 10/1973 | Rennhard |
| 3,819,484 | A | 6/1974 | Okada et al. |
| 3,876,794 | A | 4/1975 | Rennhard |
| 4,117,173 | A | 9/1978 | Schiweck et al. |
| 4,219,571 | A | 8/1980 | Miyake |
| 4,233,439 | A | 11/1980 | Schiweck et al. |
| 4,254,227 | A | 3/1981 | Okada et al. |
| 4,317,880 | A | 3/1982 | Heady |
| 4,423,150 | A | 12/1983 | Heady |
| 4,459,316 | A | 7/1984 | Bakal |
| 4,518,581 | A | 5/1985 | Miyake et al. |
| 4,537,763 | A | 8/1985 | Miyake et al. |
| 4,590,160 | A | 5/1986 | Nishihashi |
| 4,629,725 | A | 12/1986 | Hiji |
| 4,649,058 | A | 3/1987 | Schwengers et al. |
| 4,673,643 | A | 6/1987 | Schwengers |
| 4,681,771 | A | 7/1987 | Adachi et al. |
| 4,693,974 | A | 9/1987 | Schwengers et al. |
| 4,861,381 | A | 8/1989 | Paul et al. |
| 4,898,820 | A | 2/1990 | Hitoshio et al. |
| 4,961,935 | A | 10/1990 | Cherukuri |
| 4,978,751 | A | 12/1990 | Biton et al. |
| 5,017,400 | A | 5/1991 | Olinger et al. |
| 5,041,541 | A | 8/1991 | Mazur et al. |
| 5,064,672 | A | 11/1991 | Mazur et al. |
| 5,106,967 | A | 4/1992 | Mazur et al. |
| 5,116,820 | A | 5/1992 | Hiji |
| 5,120,563 | A | 6/1992 | Mohlenkamp et al. |
| 5,141,858 | A * | 8/1992 | Paul et al. ........................ 435/97 |
| 5,292,723 | A | 3/1994 | Audry et al. |
| 5,518,733 | A | 5/1996 | Lamothe et al. |
| 5,578,339 | A | 11/1996 | Kunz et al. |
| 5,605,893 | A | 2/1997 | Kaufman et al. |
| 5,695,803 | A | 12/1997 | Sharp et al. |
| 5,702,942 | A * | 12/1997 | Leathers et al. ........... 435/252.9 |

(Continued)

FOREIGN PATENT DOCUMENTS

| | | |
|---|---|---|
| CN | 1205843 A | 1/1999 |
| DE | 102 09 629 | 1/2004 |

(Continued)

OTHER PUBLICATIONS

Cote, G. L. 1983. The formatin of alpha-1-3 D-glucosidic linkages by extracellular alpha-glucansucrases from *Leuconostoc mesenteroides* and *Steptococcus mutans*. Ph.D. Dissertation. Iowa State University.*
Arguello-Morales et al., (Jan. 2000) Sequence analysis of the gene encoding alternansucrase, a sucrose glucosyltransferase from *Leuconostoc mesenteroides* NRRL B-1355, *FEMS Microbiology Letters* 182(1), 81-85.
Arguello-Morales et al., (2001) Novel oligosaccharides synthesized from sucrose donor and cellobiose acceptor by alternansucrase, *Carbohydrate Research*, 331:4, 403-411.
Biley et al, (Dec. 1994). Purification and properties of alternanase, a novel endo-alpha-1, 3-alpha-6-D-glucanase. *European Journal of Biochemistry*, 226:2, 633-639.

(Continued)

*Primary Examiner* — D. Lawrence Tarazano
*Assistant Examiner* — Hamid R Badr

(57) ABSTRACT

There is described a process for preparing a food or beverage composition having sweetness and a low glycemic index that entails incorporating in the composition a low glycemic index product comprising sucrose and an acceptor selected from the group consisting of a sugar and a sugar alcohol having free hydroxyl groups at one or more of carbon positions numbers 2, 3 and 6 that can accept a glucose unit from sucrose, the blend having been reacted with a glucansucrase enzyme. Also disclosed is a process for reducing glycemic index of a food or beverage composition that entails introducing into the food or beverage composition a low glycemic index product comprising a blend of sucrose and a syrup or syrup solids comprising an acceptor selected from the group consisting of a sugar and a sugar alcohol having a free hydroxyl groups at one or more of carbon positions numbers 2, 3 and 6 that can accept a glucose unit from sucrose, the blend having been reacted with a glucansucrase enzyme.

20 Claims, No Drawings

(56) References Cited

U.S. PATENT DOCUMENTS

| | | | |
|---|---|---|---|
| 5,776,887 | A | 7/1998 | Wibert et al. |
| 5,780,620 | A | 7/1998 | Mandai et al. |
| 5,789,209 | A | 8/1998 | Leathers et al. |
| 5,843,921 | A | 12/1998 | Kaufman et al. |
| 5,858,992 | A | 1/1999 | Nishimoto et al. |
| 5,883,243 | A | 3/1999 | Nishimoto et al. |
| 5,888,776 | A | 3/1999 | Cote et al. |
| 5,889,179 | A | 3/1999 | Cote et al. |
| 5,998,177 | A | 12/1999 | Catani et al. |
| 6,004,800 | A | 12/1999 | Aebischer et al. |
| 6,025,168 | A | 2/2000 | Vercauteren et al. |
| 6,140,304 | A | 10/2000 | Sears |
| 6,146,856 | A | 11/2000 | Heikkila et al. |
| 6,204,378 | B1 | 3/2001 | Duflot et al. |
| 6,235,511 | B1 | 5/2001 | Aebischer et al. |
| 6,242,225 | B1 | 6/2001 | Catani et al. |
| 6,242,226 | B1 | 6/2001 | Aebischer et al. |
| 6,248,375 | B1 | 6/2001 | Gilles et al. |
| 6,316,427 | B1 | 11/2001 | Axelsen et al. |
| 6,339,076 | B1 | 1/2002 | Kaufman |
| 6,365,176 | B1 | 4/2002 | Bell et al. |
| 6,372,271 | B1 | 4/2002 | Fritzsching et al. |
| 6,392,182 | B1 | 5/2002 | Hosaka |
| 6,414,138 | B1 | 7/2002 | Degelmann et al. |
| 6,423,833 | B1 | 7/2002 | Catani et al. |
| 6,486,314 | B1 | 11/2002 | Van Geel-Schutten et al. |
| 6,544,778 | B2 | 4/2003 | Roth et al. |
| 6,570,065 | B1 | 5/2003 | Kossmann et al. |
| 7,182,954 | B1 | 2/2007 | Cote et al. |
| 2001/0022980 | A1 | 9/2001 | Bell et al. |
| 2002/0065245 | A1 | 5/2002 | Brouwers |
| 2002/0170092 | A1 | 11/2002 | Turk |
| 2003/0044942 | A1 | 3/2003 | Catani et al. |
| 2003/0229923 | A1 | 12/2003 | Kossmann et al. |
| 2004/0052915 | A1 | 3/2004 | Carlson et al. |
| 2006/0127448 | A1 | 6/2006 | Carlson et al. |
| 2006/0148040 | A1 | 7/2006 | Vercauteren et al. |

FOREIGN PATENT DOCUMENTS

| | | |
|---|---|---|
| EP | 0 153 013 | 1/1985 |
| EP | 0 153 013 | 8/1985 |
| GB | 830 951 | 3/1960 |
| JP | 59 113856 | 6/1984 |
| WO | 89/07148 | 8/1989 |
| WO | WO 89/07148 | 8/1989 |
| WO | WO 95/13389 | 5/1995 |
| WO | WO 96/04365 | 2/1996 |
| WO | WO 99/57300 | 11/1999 |
| WO | WO 00/47727 | * 8/2000 |
| WO | 00/70964 | 11/2000 |
| WO | WO 00/70964 | 11/2000 |
| WO | WO 01/93831 A2 | 12/2001 |
| WO | 02/064810 | 8/2002 |
| WO | WO 02/064810 | 8/2002 |
| WO | WO 2004/023891 | 3/2004 |
| WO | WO2004023894 | 3/2004 |
| WO | WO 2004/068966 | 8/2004 |
| WO | WO 2005/089483 | 9/2005 |
| WO | WO 2006/088884 | 9/2005 |
| WO | WO 2006/088884 | 8/2006 |

OTHER PUBLICATIONS

Binder T P et al. (1983). Disproportionation reactions catalyzed by *Leuconostoc* and *Streptococcus* glucansucrases. *Carbohydrate research*, 124:2, 275-86.

Campbell et al., (2003) Controlling subjects' prior diet and activities does not reduce within-subject variation of postprandial glycemic responses to foods, *Nutrition Research*, 23, 621-629.

Cote et al., (1982) Acceptor reactions of alternansucrase from *Leoconostoc mesenteroides* NRRL B-1355, *Carbohydrate Research (Netherlands)*, 111:1, 127-142.

Cote et al., (Feb. 1982) Isolation and partial characterization of an extracellular glucansucrase from *Leuconostoc mesenteroides* NRRL B-1355 that synthesizes an alternating (1 goes to 6), (1 goes to 3)—alpha-D-glucan, *Carbohydrate Research (Netherlands)*, 101:1, 54-74.

Cote et al., (1994). Enzymically produced cyclic alpha-1, 3-linked and alpha-1, 6-linked oligosaccharides of D-glucose—e.g. D-glucosyl tetrasaccharide, using *Bacillus* sp. Alternanase. *Eur. J. Biochem.*, 226:2, 641-648.

Cote et al. (1999). Some structural features of an insoluble alpha-D-glucan from a mutant strain of *Leuconostoc mesenteroides* NRRL B-1355. *Journal of Industrial Microbioloby & Biotechnology*. 23:1, 656-660.

Cote, G. L. (1983). The formation of Alpha (1-→3) D glucosidic linkages by exocellular alpha-d-glucansucrases from *Leuconostoc mesenteroides* and *Streptococcus*. Iowa State University (0097), 44/12-B of dissertation abstracts international, 3747 (202 pp.).

Grimble et al., (1997) Differences in the glycaemic response to dextran and maltodextrin ingestion in man, *Proceedings of the Nutrition Society*, 56:2, 225A.

Jeanes et al., (1954) Characterization and classification of dextrans from ninety-six strains of bacteria, Starch and Dextrose Section, Northern Utilization Research Branch.

Joucla G. et al., (Mar. 2004). Capillary electrophoresis analysis of gluco-oligosaccharide regioisomers. *Electrophoresis*, 25:6, 861-869.

Leathers T D et al. (1997). Alternansucrase mutants of *Leuconostoc mesenteroides* strain NRRL B-21138. *Journal of Industrial Microbioloby and Biotechnology*, 18:4, 278-283.

Lopez-Munguia et al., (1990) Production and purification of *Leuconostoc mesenteroides* NRRL B-1355 Alternansucrase. *Annals of the New York Academy of Sciences*. pp. 717-722.

Lopez-Munguia et al., (1993) Production and purification of alternansucrase, a glucosyltransferase from *Leuconostoc mesenteroides* NRRL B-1355, for the synthesis of oligoalternans, *Enzyme and Microbial Technology* 15:1, 77-85.

Raemaekers et al., (1997) Production of alternansucrase by *Leuconostoc mesenteroides* NRRL B-1355 in batch fermentation with controlled pH and dissolved oxygen, *J. Chem. Tech. Biotechnol*, 69, 470-489.

Remaud-Simeon et al, (2000) Glucansucrases: molecular engineering and oligosaccharide synthesis. *Journal of Molecular Catalysis B: Enzymatic 10*, 117-128.

Remaud-Simeon et al, (2003) Glucansucrases: Structural basis, Mechanistic aspects, and new perspectives for engineering. *Oligosaccharides in Food and Agriculture*, American Chemical Society, 90-103.

Robeson et al., (Jan. 1983) Expression of a *Streptococcus mutans* glucosyltransferase gene in *Escherichia coli*, *Journal of Bacteriology*, 153, 211-221.

Zahnley et al., (2000) Cellular association of *glucosyltransferases* in *Leuconostoc mesenteroides* and effects of detergent on cell association, *Applied Biochemistry and Biotechnology*, 87, 57-70.

IUBMB Enzyme Nomenclature, EC 2.4.1.140 (created 1984, modified 2003).

Monchois et al., "Cloning and sequencing of a gene coding for a novel dextransucrase from *Leuconostoc mesenteroides* NRRL B-1299 synthesizing only alpha (1-6) and alpha (1-3) linkages", *Gene*, 182 (1-2), 23-32 (1996).

Smith et al., "*Leuconostoc mesenteroides* B-1355 mutants producing alternansucrases exhibiting decreases in apparent molecular mass", (1997). *Appl Environ Microbiol*, 63(2), 581-586 (1997).

Zahnley et al., "Insoluble Glucan Formation by *Leuconostoc mesenteroides* B-1355", *Appl Environ Microbiol*, 61(9), 1120-1123 (1995).

Cote et al., "Production, isolation, and immobilization of alternansucrase", Cells Abstracts Papers American Chemical Society Meeting, 1 page (1994).

Campbell et al., "Controlling subjects' prior diet and activities does not reduce within-subject variation of postprandial glycemic responses to food", *Nutrition Research*, 23, 621-629 (2003).

Paul, "Acceptor reaction of a highly purified dextransucrase with maltose and oligosaccharides. Application to the synthesis of controlled-molecular-weight dextrans", *Carbohydrate Research*, 149, 433-441 (1986).

Argüello-Morales et al., "Sequence analysis of the gene encoding alternansucrase, a sucrose glucosyltransferase from *Leuconostoc mesenteroides* NRRL B-1355", *FEMS Microbiol Lett.*, 182(1), 81-85 (2000).

Argüello-Morales et al., "Novel oligosaccharides synthesized from sucrose donor and cellobiose acceptor by alternansucrase", *Carbohydr Res.*, 331(4), 403-411 (2001).

Biely et al., "Purification and properties of alternanase, a novel endo-alpha-1,3-alpha-1,6-D-glucanase", *Eur J Biochem.*, 226(2), 633-639 (1994).

Binder et al., "Disproportionation reactions catalyzed by *Leuconostoc* and *Streptococcus glucansucrases*", *Carbohydr Res.*, 124(2), 275-286 (1983).

Campbell et al., "Controlling subjects' prior diet and activities does not reduce within-subject variation of postprandial glycemic responses to food", *Nutrition Research*, 23, 621-629 2003.

Cote et al., "Acceptor reactions of alternansucrase from *Leuconostoc mesenteroides* NRRL B-1355", *Carbohydrate Research*, 111, 127-142 (1982).

Cote et al., "Enzymically produced cyclic alpha-1,3-linked and alpha-1,6-linked oligosaccharides of D-glucose", *Eur J Biochem.*, 226(2), 641-648 (1994).

Cote et al., "The formation of α-(1-3) D-glucosidic linkages by exocellular α-D-glucansucrases from *Leuconostoc mesenteroides* and *Streptococcus mutans*", *Dissertation Abstracts International*, 44 (12), 3747-B 1984.

Cote et al., "Isolation and partial characterization of an extracellular glucansucrase from *Leuconostoc mesenteroides* NRRL B-1355 that synthesizes an alternating (1-6), (1-3)-alpha-D-glucan", *Carbohydr Res.*, 101(1), 57-74 (1982).

Cote et al., "Some structural features of an insoluble alpha-D-glucan from a mutant strain of *Leuconostoc mesenteroides* NRRL B-1355", *J Ind Microbiol Biotechnol.*, 23(1), 656-660 (1999).

Grimble et al., "Differences in the glycaemic response to dextran and maltodextran ingestion in man", *Proceedings of the Nutrition Society*, 56(2), 225A (1996).

Jeanes et al., "Characterization and classification of dextrans from ninety-six strains of bacteria", *The Journal of the American Chemical Society*, 76, 5041-5052 (1954).

Joucla et al., "Capillary electrophoresis analysis of glucooligosaccharide regioisomers", *Electrophoresis*, 25(6), 861-869 (2004).

Leathers et al., "Alternansucrase mutants of *Leuconostoc mesenteroides* strain NRRL B-21138", *Journal of Industrial Microbiology and Biotechnology*, 18, 278-283 (1997).

Lopez-Munguia et al., "Production and purification of *Leuconostoc mesenteroides* NRRL B-1355 alternansucrase", *Annals of the New York Academy of Sciences*, 613, 717-722 (1990).

Lopez-Munguia et al., "Production and purification of alternansucrase, a glucosyltransferase from *Leuconostoc mesenteroides* NRRL B-1355, for the synthesis of oligoalternans", *Enzyme and Microbial Technology*, 15(1), 77-85 (1993).

Monchois et al., "Cloning and sequencing of a gene coding for a novel dextransucrase from *Leuconostoc mesenteroides* NRRL B-1299 synthesizing only alpha (1-6) and alpha (1-3) linkages", *Gene*, 182(1-2), 23-32 (1996).

Raemaekers et al., "Production of alternansucrase by *Leuconostoc mesenteroides* NRRL B-1355 in batch fermentation with controlled pH and dissolved oxygen", *J. Chem. Tech. Biotechnol.*, 69, 470-478 (1997).

Remaud-Simeon et al., "Glucansucrases: Molecular engineering and oligosaccharide synthesis", *Journal of Molecular Catalysis B: Enzymatic 10*, 117-128 (2000).

Remaud-Simeon et al., "Glucansucrases: Structural basis, mechanical aspects, and new perspectives for engineering", *ACS Symposium Series*, 849, 90-103 (2003).

Robeson et al., "Expression of a *Streptococcus mutans* glucosyltransferase gene in *Escherichia coli*", *J Bacteriol.*, 153(1), 211-221 (1983).

Smith et al., "*Leuconostoc mesenteroides* B-1355 mutants producing alternanucrases exhibiting decreases in apparent molecular mass", *Appl Environ Microbiol*, 63(2), 581-586 (1997).

Zahnley et al., "Cellular association of glucosyltransferases in *Leuconostoc mesenteroides* and effects of detergent on cell association", *Appl Biochem Biotechnol.*, 87(1), 57-70 (2000).

Zahnley et al., "Insoluble Glucan Formation by *Leuconostoc mesenteroides* B-1355", *Appl. Environ Microbiol*, 61(3), 1120-1123 (1995).

PCT International Search Report PCT/US06/005210 mailed Jul. 11, 2006. 1 page.

Pci International Search Report PCT/US03/028474 mailed Dec. 19, 2003. 1 page.

European Search Report, European Patent Office, European Application No. 06720745.6-1521, Dated Jul. 18, 2011. 3 Pages.

European Search Report, European Patent Office, European Application No. 03795690.1-2114, Dated Sep. 5, 2005. 4 Pages.

Bhatnagar et al. "Structure of the dextran synthesized by a new strain of *Leuconostoc meseenteroides*" Carbohydrate Research 89, 1981, pp. 346-349.

Timothy et al. "Biofilm formation by strains of *Leuconostoc citreum* and *L. mesenteroides*", Biotechnol Lett. Mar. 2011; 33(3): pp. 517-523.

Cote, "Low-viscosity α-d-glucan fractions derived from sucrose which are resistant to enzymatic digestion", Carbohydrate Polymers, 0144-8617, 1992, pp. 249-252.

Cote et al. "Oligosaccharide synthesis by enzymatic transglycosylation", Glycoconjugate Journal, 7, 1990, pp. 145-162.

Dols et al; Structural characterization of the maltose acceptor-products synthesized by *Leuconostoc mesenteroides* NRRL B-1299 dextransucrase; Carbohydrate Research 305, 1998, pp. 549-559.

Dols et al. Dextransucrase production by *Leuconostoc mesenteroides* NRRL B-1299. Comparison with *L. mesenteroides* NRRL B-512F, Enzyme and Microbial Technology 20; 1997, pp. 523-530.

Dols et al. Growth and energetics of *Leuconostoc mesenteroides* NRRL B-1299 during metabolism of various sugars and their consequences for dextransucrase production. Applied and Environmental Microbiology, Jun. 1997, pp. 2159-2165.

Ebert et al. "Mechanisms of Biopolymer Growth: The Formation of Dextran and Levan", Adv. Enzymol 300, 1968, pp. 179-211.

Funane et al. "Water-soluble and water-insoluble glucans produced by *Escherichia coli* recombinant dextransucrases from *Leuconostoc mesenteroides* NRRL B-512F", Carbohydrate Research 334, 2001, 19-25.

Fu et al, "Maltodextrin acceptor reactions of *Streptococcus mutans* 6715 glucosyltransferases", Carbohydrate Research, 217, 1991, pp. 201-211.

Kitaoka et al., "Mechanism of the action of *Leuconostoc mesenteroides* B-512FMC dextransucrase: kinetics of the transfer of d-glucose to maltose and the effects of enzyme and substrate concentrations". Carbohydrate Research: 320, 1999, pp. 183-191.

Kitaoka et al., "Large-scale preparation of highly purified dextransucrase from a high-producing constitutive mutant of *Leuconostoc mesenteroides* B-512FMC", Enzyme and Microbial Technology, 23, 1998, pp. 386-391.

Kim et al. "Production, selection, and characteristics of mutants of *Leuconostoc mesenteroides* B-742 constitutive for dextransucrases", Enzyme and Microbial Technology 17, 1995, pp. 689-695.

Kelly et al. "Differentiation of dextran-producing *Leuconostoc* strains from fermented rice cake (puto) using pulsed-field gel electrophoresis", International Journal of Food Microbiology 26, 1995, pp. 345-352.

Kuge et al. "Degrees of Long-Chain Branching in Dextrans", Carbohydrate Research 160, 1987, pp. 205-214.

Koepsell et al. "Enzymatic synthesis of dextran; acceptor specificity and chain initiation", The Journal of Biological Chemistry, vol. 200, pp. 793-801.

Lopretti et al. "Influence of nitrogen/carbon ratio and complementary sugars on dextransucrase production by *Leuconostoc mesenteroides* NRRL B512(f)", Process Biochemistry 34, 1999, pp. 879-884.

Lee et al. "Production of glucooligosaccharides by an acceptor reaction using two types of glucansucrase from *Streptococcus sobrinus*"; Biotechnology Letters 19, 1997, 1227-1230.

Monchois et al., "Glucansucrases: mechanism of action and structure—function relationships". FEMS Microbiology Reviews 23; 1999, pp. 131-151.

Mountzouris et al. "Modeling of oligodextran production in an ultrafiltration stirred-cell membrane reactor", Enzyme and Microbial Technology. 1999, pp. 75-85.

Marinan Santos et al. "Production of dextransucrase, dextran and fructose from sucrose using *Leuconostoc mesenteroides* NRRL B512(f)"; Biochemical Engineering Journal 4. 2000, 177-188.

Miyaji et al. "The structure of a dextran produced by *Leuconostoc mesenteroides* NRRL B-1397: The linkages and length of the branches", Carbohydrate Research, 1973, pp. 277-287.

Miller et al. "Milligram to gram scale purification and characterization of dextransucrase from *Leuconostoc mesenteroides* NRRL B-512F" Carbohydrate Research, 1986, pp. 119-133.

Mitsuishi et al. "Structures of three α-d-(1→2)-branched oligosaccharides isolated from *Leuconostoc mesenteroides* NRRL B-1299 dextran", Carbohydrate Research, 1984, pp. 331-337.

Olano-Martin et al., "In vitro fermentability of dextran, oligodextran and maltodextrin by human gut bacteria". British Journal of Nutrition. 2000, 83, 247-255.

Oriol et al. "Acceptor Reaction of a Highly Purified Dextransucrase with Maltose and Oligosaccharides Application to the Synthesis of Controlled-Molecular-Weight Dextrans", Carbohydrate Research, 1449, pp. 433-441.

Robyt, "Mechanisms in The Glucansucrase Synthesis of Polysaccharides and Oligosaccharides From Sucrose", Advances in Carbohydrate Chemistry and Biochemistry, vol. 51, 1995, pp. 133-148.

Sanz et al. "Prebiotic properties of alternansucrase maltose-acceptor oligosaccharides" Journal of Agricultural and food chemistry, vol. 53, Jun. 22, 2005. pp. 5911-5916, XP002647292.

Smitinont et al. "Exopolysaccharide-producing lactic acid bacteria strains from traditional thai fermented foods: isolation, identification and exopolysaccharide characterization". Internation Journal of Food Microbiology, 51, 1999, pp. 105-111.

Seymour et al. "Structural analysis of dextrans, from strains of *Leuconostoc* and related genera, that contain 3-*O*-α-d-glucosylated α-d-glucopyranosyl residues at the branch points, or in consecutive, linear positions", Carbohydrate Research, 1980, pp. 105-129.

Shamala et al. "Preliminary studies on the production of high and low viscosity dextran by *Leuconostoc* spp." Process Biochemistry vol. 30, No. 3, 1996, pp. 237-241.

Spanier et al. Chemistry of Novel Foods; U.S. Dept. of Agric., 1995, pp. 95-109.

Zhou Zhongkai et al. "Novel process for the production of fructose syrup by enzymatic hydrolysis of sucrose". China Beet &Sugar, No. 5, pp. 1-4. (Translated copy is also enclosed—7 pages).

Sanz et al., "Prebiotic properties of alternansucrase maltose-acceptor oligosaccharides," Journal of Agricultural and Food Chemistry, vol. 53, Jun. 22, 2005, pp. 5911-5916.

Zhou Zhongkai et al., "Novel process for the production of frutose syrup by enzymatic hydrolysis of sucrose," China Beet & Sugar, No. 5, pp. 1-4, (1998).

Marinan Santos et al., "Production of dextransucrase, dextran and fructose from sucrose using *Leuconostoc mesenteroides* NRRL B512(f)," Biochemical Engineering Journal 4, 2000, pp. 177-188.

Olano-Martin et al., "In vitro fermentability of dextran, oligodextran and maltodextrin by human gut bacteria," British Journal of Nutrition, 2000, pp. 83, 247-255.

Lopretti et al., "Influence of nitrogen/carbon ratio and complementary sugars on dextransucrase production by *Leuconostoc mesenteroides* NRRL B512(f)," Process Biochemistry 34, 1999, pp. 879-884.

Smitinont et al., "Exopolysaccharide-producing lactic acid bacteria strains from traditional thai fermented foods: isolation, identification and exopolysaccharide characterization," International Journal of Food Microbiology, 51, 1999, pp. 105-222.

Monchois et al., "Glucansucrases: mechanism of action and structure-function relationships," FEMS Microbiology Reviews 23, 1999, pp. 131-151.

Mountzouris et al., "Modeling of oligodextran production in an ultrafiltration stirred-cell membrane reactor," Enzyme and Microbial Technology, 1999, pp. 75-85.

Kitaoka et al., "Large-scale preparation of highly purified dextransucrase from a high-producing constitutive mutant of *Leuconostoc mesenteroides* B-512FMC," Enzyme and Microbial Technology, 23, 1998, pp. 386-391.

Lee et al., "Production of glucooligosaccharides by an acceptor reaction using two types of glucansucrase from *Streptococcus sobrinus*," Biotechnology Leters 19, 1997, pp. 1227-1230.

Kim et al., "Production, selection and characteristics of mutants of *Leuconostoc mesenteroides* B-742 constitutive for dextransucrases," Enzyme and Microbial Technology 17, 1995, pp. 689-695.

Kelly et al., "Differentiation of dextran-producing *Leuconostoc* strains from fermented rice cake (puto) using pulsed-field gel electrophoresis," International Journal of Food Microbiology 26, 1995, pp. 345-652.

Spanier et al., Chemistry of Novel Foods; U.S. Dept. of Agric., 1995, pp. 95-109.

Shamala et al., "Preliminary studies on the production of high and low viscosity dextran by *Leuconostoc* spp." Process Biochemistry vol. 30, No. 3, 1996, pp. 237-241.

Robyt, "Mechanisms in the Glucansucrase Synthesis of polysaccharides and Oligosaccharides from Sucrose," Advances in Carbohydrate Chemistry and Biochemistry, vol. 51, 1995, pp. 133-148.

Kuge et al., "Degrees of Long-Chain branching in Dextrans," Carbohydrate Research 160, 1987, pp. 205-214.

Oriol et al., "Acceptor reaction of a highly purified dextransucrase with maltose and oligosaccharides application to the synthesis of controlled-molecular-weight dextrans," Carbohydrate Research, 1449, pp. 433-441, (1986).

Miller et al., "Milligram to gram scale purification and characterization of dextransucrase from *Leuconostoc mesenteroides* NRRL B-512F," Carbohydrate Research, 1986, pp. 119-133.

Mitsuishi et al., "Structures of three a-d-(1-2)-branched oligosaccharides isolated from *Leuconostoc mesenteroides* NRRL B1299 dextran," Carbohydrate Research, 1984, pp. 331-337.

Seymour et al. "Structural analysis of dextrans, from strains of *Leuconostoc* and related genera, that contain 3-O-α-d-glucosylated α-d-glucopyranosyl residues at the branch points, or in consecutive, linear positions"", Carbohydrate Research, 1980, pp. 105-129.".

Miyaji et al. "The structure of a dextran produced by *Leuconostoc mesenteroides* NRRL B-1397: The linkages and length of the branches"", Carbohydrate Research, 1973, pp. 277-287.".

Koepsell et al. "Enzymatic synthesis of dextran; acceptor specificity and chain initiation", The Journal of Biological Chemistry, vol. 200, pp. 793-801, (1952).

\* cited by examiner

USE OF LOW-GLYCEMIC SWEETENERS IN FOOD AND BEVERAGE COMPOSITIONS

CROSS REFERENCE TO RELATED APPLICATIONS

This application is a section 371 national-stage phase of International Application No. PCT/US2003/28474, filed 11 Sep. 2003, titled "USE OF LOW-GLYCEMIC SWEETENERS IN FOOD AND BEVERAGE COMPOSITIONS" which is a continuation application of U.S. application Ser. No. 10/243,283 filed 13 Sep. 2002 now abandoned, titled "USE OF LOW GLYCEMIC INDEX SWEETENERS IN FOOD AND BEVERAGE COMPOSITIONS" which is hereby incorporated by reference in its entirety.

FIELD OF THE INVENTION

This invention relates to low-glycemic sweeteners, food products containing low-glycemic sweeteners, and methods of producing such products from blends of sucrose and an acceptor selected from the group consisting of a sugar or sugar alcohol having free hydroxyl groups at one or more of carbon positions numbers 2, 3 and 6 (also referred to as the C-2, C-3 and C-6 positions) that can accept a glucose unit from sucrose, that are reacted with a glucansucrase enzyme. The resulting products have low glycemic index, and are useful in any application that includes a product having both sweetness and a low glycemic index.

BACKGROUND OF THE INVENTION

Typical corn syrups that are useful in the production of beverages, sports drinks, and other food applications are known. It would be desirable, however, to have available for use in beverages, sports drinks, and other food applications, as required, a product having sweetness similar to that of corn syrups, preferably with mouth-feel and functionality similar to typical corn syrups, and having a lower glycemic index.

SUMMARY OF THE INVENTION

It is accordingly an object of the present invention to provide a process for preparing new and improved food products such as animal feed, beverages, bakery products, confectionery products, condiments, and snacks, characterized by having sweetness and a lower glycemic index. Glycemic index is correlatable with glucose release and can be tested using the procedure provided in Example 5, below.

In accordance with the present invention, it has been found that the above and still further objects are achieved by utilizing as a sweetener for a food or a beverage, a product having low glycemic index. The low-glycemic sweeteners are prepared by reacting sucrose and an acceptor selected from the group consisting of a sugar or a sugar alcohol having free hydroxyl groups at one or more of carbon positions numbers 2, 3 and 6 that can accept a glucose unit from sucrose, with a glucansucrase enzyme. The products resulting from the reaction contain fructose and various glucose oligosaccharides.

Also included within the present invention, are the foods and beverages that utilize as the sweetener, at least one, or more, product prepared by reacting a blend of sucrose and an acceptor selected from the group consisting of a sugar or a sugar alcohol having free hydroxyl groups at one or more of carbon positions numbers 2, 3 and 6 (also referred to as the C-2, C-3 and C-6 positions) that can accept a glucose unit from sucrose, with a glucansucrase enzyme. The resulting product contains fructose and various glucose oligosaccarides, and has a low glycemic index.

Another aspect of the invention comprises food products that include a low-glycemic sweetener that result in a food product that has at least 10%, 20%, 40% or 50% lower glycemic index than the glycemic index of a control food product that is made using conventional sweeteners. In additional embodiments the low-glycemic sweetener is made by reacting sucrose and an acceptor, such as maltose, at a ratio of at least 4:1 in the presence of a glucansucrase enzyme, such as the enzyme isolated from *Leuconostoc mesenteroides* (LM) strain NRRL-B-21297.

These and other objects and advantages of the present invention will be apparent to those skilled in the art from the following detailed description and claims.

DETAILED DESCRIPTION OF THE INVENTION

In accordance with the present invention, it has been found that the above and still further objects are achieved by utilizing as a low-glycemic sweetener in the making of food products. Glycemic index is correlatable with glucose release. The making and use of the low-glycemic sweetener is described below.

Making the Low-Glycemic Sweetener

The acceptor and sucrose are reacted with a glucansucrase enzyme that will transfer glucose units from sucrose to an acceptor carbohydrate and will release fructose and glucose oligosaccarides of various lengths. The resultant product may have a level of sweetness similar to that of a corn syrup, and a mouth-feel and functionality similar to that of corn syrup. In addition, and more significantly for the present process, the resulting product is characterized by having a lower glycemic index as compared to the combination of the reactants (sucrose and acceptors) that are not reacted with enzyme.

The acceptor can be selected from the group consisting of a sugar or a sugar alcohol having free hydroxyl groups at one or more carbon positions numbers 2, 3 and 6 that can accept a glucose unit from sucrose. The acceptor can be in the form of syrup or syrup solids. Exemplary of the syrups or syrup solids suitable for use herein are maltose, maltotriose, panose, high maltose (over 40%) corn syrup, medium to low DE (dextrose equivalent) corn syrup, raffinose, cellobiose, maltitol, maltotriose, maltotetrose, glucose, isomaltose, isomaltitol, barley syrup and syrup solids, rice syrup and syrup solids, lactose, whey permeate, tapioca starch syrup and syrup solids, nigerose, kojibiose, isomaltooligosaccharide, hydrogenated starch syrup, potato starch syrup and syrup solids, corn syrup and syrup solids, and the like. Exemplary of the syrups that are suitable for use in the blends are, but not limited to, SATINSWEET™, available from Cargill, Incorporated, that contains minimal 55 to 70 weight % maltose and 45 to 30% weight % of glucose and other glucose-containing oligomers. In a preferred embodiment, the syrup or syrup solids used herein comprise an amount of from about 2 to about 99% by weight of maltose.

The glucansucrase enzymes that can be used in the reaction to produce the low-glycemic sweetener include, but not limited to, LM strains NRRL-B 1121, 1143, 1149, 1254, 1297, 1298, 1355, 1374, 1375, 1377, 1399, 1402, 1433, 23185, 23186, 23188, 23311, 742, 523, 21297, and other enzymes provided herein. These strains can be cultured and the enzymes can be isolated using any method known in the art, such as the method provided below. For example, a process for producing the low-glycemic sweetener suitable for use herein comprises reacting, or incubating, blends of sucrose and syrup or syrup solids, as an acceptor carbohydrate, in varying ratios of components, in a total sugar concentration of from about 2 to about 40%, with an amount of the glucansucrase from LM and other lactic acid bacteria, sufficient to provide a low glycemic index product. The reaction, or incubation, is carried out at a temperature of about 30 to about 45° C., for a period of about 1 to about 48 hours.

The characteristics of the low-glycemic sweetener can be altered by controlling the ratio of sucrose to acceptor. Generally, the glycemic index of the product produced will decrease as the ratio of sucrose to acceptor increases. For example, it is expected that a product made using a ratio of 1:1 (sucrose to acceptor) will have a higher glycemic index than that of a product created using a ratio of 4:1 (sucrose to acceptor). Therefore, the invention provides methods of making low-glycemic sweeteners using ratios of sucrose to acceptor of at least 4:1, 5:1, 6:1, 7:1, 8:1, 9:1, and 10:1. Accordingly, the invention also provides food products made by such methods.

The low-glycemic sweeteners can also be characterized by the linkages between the glucose molecules in the glucose oligosaccharide. In some embodiments the glucose oligosaccharide has both alpha 1,3 and alpha 1,6 linkages, and the glucose oligosaccharide product may also contain, but is not limited to, other linkages such as alpha 1,4. In some embodiments that low-glycemic sweetener will have at least 20% alpha 1,3 linkages and in other embodiments the low-glycemic sweetener will have at least 20% alpha 1,3 linkages and at least 20% alpha 1,6 linkages.

The low-glycemic sweetener can also be subsequently processed to remove a portion of, or all of the fructose, thus yielding a low-glycemic sweetener that is fructose depleted. Fructose can be removed from the low-glycemic sweetener using any method known in the art, for example by using column chromatography. Generally, the low-glycemic sweetener contains less than 50% fructose.

More specifically, the low-glycemic sweetener can be made from syrups that contain one or more acceptors. When the acceptor used is in the form of a syrup it can be blended using any technique known in the art. For example the blends may be produced by physical mixing of the sucrose and the syrup or syrup solids. As used in the examples herein, the blends of sucrose and syrup or syrup solids were produced by blending. In several of the examples herein, there are exemplified blends of sucrose and corn syrup comprising about 65 weight percent maltose (SATIN-SWEET™ 65) comprising sucrose to SATIN-SWEET™ 65 corn syrup in ratios of 3:2, 2:1, and 5:2 on a dry weight basis. However, as mentioned herein, any ratio of sucrose to syrup or syrup solids such as from about 20:1 to 1:20 sucrose to syrup or syrup solids, may be used that allows a low glycemic index product to be obtained. More precisely, in several of the examples, there was utilized SATINSWEET™ 65 corn syrup, a trademarked product available from Cargill, Incorporated that contains minimal 65% by weight maltose and 35% by weight glucose and other glucose-containing oligomers.

Uses of the Low-Glycemic Sweetener

The low-glycemic sweeteners described herein, and exemplified in the Examples are expected to be useful in the preparation of food and beverage compositions characterized by having a lower glycemic index than food products made using conventional sweeteners. It is expected that the low-glycemic sweeteners described herein may be successfully incorporated as sweeteners in any food product where conventional sweeteners are used, including animal feed, beverages, confectioneries, condiments, energy drinks, chewing gum, ice cream, desserts, pet food, and the like, where it is desired to produce low glycemic foods or drinks. The low-glycemic sweeteners may be incorporated in the food or beverage compositions in any desired amount, depending on the specified application. For example, the low-glycemic sweetener may be incorporated in an amount ranging from about 0.1 to about 99.9% by weight of the food or beverage composition.

Food products containing the low-glycemic sweetener will generally have a glycemic index that is at least 10% lower than the glycemic index of a substantially similar product made using conventional sweeteners. Conventional sweeteners as used herein refers sucrose-based sweeteners, such as granulated sugar, liquid sugar, and brown sugar, starch-based sweeteners, such as dextrose based products including maltodextrin, corn syrup and corn syrup solids, and dextrose, fructose based products including high fructose corn syrup and crystalline fructose, and other starch-based products such as maltose and malt syrup. Other specialty sweeteners are also used including honey and artificial honey, lactose, maple syrup and maple sugar, and fruit-derived sweeteners.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

Examples 1 and 2, provided below teach how to make the low-glycemic sweetener described herein. Additionally, the examples described below provide results showing that the low-glycemic sweetener described herein is low-glycemic. This is shown by in vitro experimentation using glucoamylase assays to estimate glycemic index (Example 3, Studies 1-3), and experimentation using rat intestinal powder to estimate glycemic index (Example 4) and finally through human clinical trials (Example 5). Example 6 provides the results relating to low glycemic sweeteners made with various enzymes, and example 7 provides food compositions that are created using the low-glycemic sweetener.

Example 1

Method of Preparing Enzymes

LM strain NRRL-B-523 or NRRL-B-21297 was cultured in a 200-liter fermenter at 30° C. with mixing at 150 revolutions per minute (rpm) in a medium containing 0.22 weight % Hy Pep 1510 (enzymatic hydrolysis of soy), 0.22 weight % HY-YEST 412 (spray-dried extract from primary grown baker's yeast), both available from Quest, International, Hoffman Estates, Ill., 0.2 weight % ammonium citrate, 0.5 weight % sodium citrate, 0.01 weight % magnesium sulfate, 0.005 weight % manganese sulfate and 0.2 weight percent potassium phosphate (dibasic) supplemented with 2 weight percent sucrose and 2 weight percent SATIN-SWEET™ 65 corn syrup comprising 65 weight percent maltose for 18 hours. The resulting cultural supernatant was clarified by filtration of the supernatant through 0.1 micron Amicon hollow fiber filters, available from Millipore, Bedford, Mass., at 4° C. Enzyme from the clarified supernatant was purified and concentrated from other medium components by ultrafiltration through a 50,000 k D molecular weight Pellicon-2 polyethersulfone cassette diafiltration membrane, available from Millipore, Bedford, Mass. 20 liters of enzyme solution was obtained, which is 10-fold concentrated as compared to the starting cultural supernatant.

Example 2

Various Acceptors Useful for Producing Low-Glycemic Sweeteners

Enzyme from the LM NRRL-B-21297 strain was tested to determine the suitability of various acceptors. Enzyme was prepared using the methods described herein.

In determining the suitability of the preparation of the sucrose/acceptor products, 0.4% by weight of each sucrose and acceptor were mixed with enzyme solution in 0.01 M sodium gluconate buffer, pH 6, and the reaction proceeded for 2 hours at 37° C.

The carbohydrate profiles of products generated by the enzyme reactions with the blends of sucrose and syrups and syrup solids herein, were analyzed by high performance liquid chromatography (HPLC) using two (2) Bio-Rad Aminex HPX42A carbohydrate columns (300 mm×7.8 mm) available from Bio-Rad, Hercules, Calif., in succession, with water as the eluate at 0.2 ml/min, at a temperature of 65° C.

The reaction rate was estimated based on the amount of oligosaccharides generated from each acceptor and normalized against the fructose concentration in each reaction. The results are reported below in Table 2.0. The values reported for oligosaccharides to fructose are for DP3-DP7 minus starting material.

TABLE 2.0

| Example Number | Acceptor | Weight Ratio of Oligosaccharide to Fructose |
|---|---|---|
| 1 | Maltose | 2.02 |
| 2 | Panose | 1.56 |
| 3 | Isomaltose | 0.93 |
| 4 | Maltotriose | 0.53 |
| 5 | Maltotetrose | 0.38 |
| 6 | Glucose | 0.49 |

From the data it is observed that maltose is the best acceptor for the enzyme from strain NRRL-B-21297, followed by panose and isomaltose.

As part of this evaluation, other sugars were evaluated for suitability as acceptors. The sugars were xylose, arabinose and myo-inositol. These sugars were found to be not as effective acceptors as the acceptors listed in Table 2.0 within the two (2) hour reaction time.

Example 3

In Vitro Studies Using Glucoamylase to Estimate Glycemic Index

The three studies described below provide data relating to the carbohydrate profiles of the various low-glycemic sweeteners, as well as the glycemic index estimate (as identified using glucoamylase and HCl) of the various low-glycemic sweeteners.

A. Study 1

LM strain NRRL-B-21297 was cultured as described above, and the recovered enzymes were resuspended in 0.01 M gluconate buffer (pH 6), up to the original supernatant volume, together with 8% by weight of total sugars, in ratios of 3:2, 2:1; and 5:2, of sucrose to SATIN-SWEET™ corn syrup containing 65 weight % maltose (65HM herein). The enzyme reaction was allowed to proceed for 16 hours at a temperature of 37° C., with mild agitation.

At the completion of the reaction, the resultant products were analyzed by the HPLC method described herein.

The resulting three (3) products contain the sugar profiles reported in Table 3.0.

TABLE 3.0

| | Suc/65 HM ratio | | |
|---|---|---|---|
| | 3:2 | 2:1 | 5:2 |
| Higher | 0.97 | 0.79 | 0.69 |
| DP8 | 0 | 0.82 | 1.45 |
| DP7 | 1.56 | 2.74 | 3.92 |
| DP6 | 3.02 | 5.13 | 6.76 |
| DP5 | 12.01 | 15.1 | 16.1 |
| DP4 | 20.49 | 19.27 | 16.89 |
| DP3 | 24.47 | 16.32 | 11.21 |
| Maltose | 3.87 | 1.66 | 0.84 |
| Glucose | 2.97 | 3.87 | 4.9 |
| Fructose | 30.64 | 34.28 | 37.24 |

*Table 1. Carbohydrate profiles of *L. mesenteroides* B-21297 enzymes incubated with sucrose and SATIN-SWEET ™ 65 corn syrup at three ratios. Numbers represent percentages of total carbohydrates in the final product. Abbreviations: DP = degree of polymerization; higher = sugars with a DP > 8.

To obtain an estimate of the glycemic index of the products, in vitro digestibility assays, using glucoamylase and acid hydrolysis to simulate digestion, were performed. An amount of 0.08% of glucoamylase, (v/v) available from Genencor, Rochester, N.Y., under the tradename, Optidex L-400, was used at a temperature of 37° C., for a period of 1 hour, with mild agitation. The reactions were stopped by the addition of hydrochloric acid (HCl) to a final concentration of 0.24M (molar), and heating at 90° C. for a period of 5 minutes. The amount of glucose released was measured by HPLC using an Aminex HPX-87H ion exclusion column, available from Bio-Rad, with 0.01N (normal) sulfuric acid as the mobile phase.

The results are reported in Table 3.1 below.

TABLE 3.1

| | (% Glucose Release)* | |
|---|---|---|
| suc/65 HM | Control Product without glucansucrase treatment | Low glycemic sweetener after glucansucrase treatment |
| 3:2 | 100.00% | 36.10% |
| 2:1 | 100.00% | 28.70% |
| 5:2 | 100.00% | 38.70% |

*Table 2. Amount of oligosaccharides present in products generated by *L mesenteroides* B-21297 enzymes and their respective glucose release values as determined by the in vitro digestibility assays with glucoamylase.

From the data in Tables 3.0 and 3.1, it is observed that the three products comprising blends of sucrose and corn syrup containing 65 weight % maltose, in varying ratios, are sweet, since the content of fructose ranges from about 30 to about 37%. Furthermore, it is expected that the three products will be low glycemic, unique mouth-feel and functionality in various food and beverage applications.

Study 2

Cultural supernatant of LM NRRL-B21297 was used to convert blends of sucrose and corn syrup or corn syrup solids containing either 65 weight % maltose (65HM), or 96 weight % maltose (96HW, to low-glycemic sweeteners. In so doing, a total of 20 weight %, or 30 weight %, sugars in water, of various ratios of sucrose to acceptor, containing either 65 or 96 weight percent maltose, were incubated with 10 weight % of concentrated enzyme solution, at a temperature of 37° C. for a period of about 16 hours. Enzyme activity was inactivated by heat treatment at a temperature of 121° C. for a period of 10 minutes. The resulting syrups were filtered through 0.7 micron glass fiber filter (Pall Corporation, Ann Arbor, Mich.), treated with activated carbon, and treated with cation and anion exchange resins to remove color, protein, and ions. The products were filtered through Whatman No. 3 filter paper (Whatman International, Ltd. Maidstone, England) to remove carbon fines. The resulting low-glycemic sweeteners were then evaporated at a temperature of 70° C. to 80% dry solids.

The carbohydrate profile of the resulting low-glycemic sweeteners are reported in the following Table 3.2.

TABLE 3.2

|  | 3:2 suc/65 HM LGS1 | 3:1 suc/65 HM LGS2 | 3:2 suc/96 HM LGS3 | 2:1 suc/96 HM LGS4 | 7:2 suc/65 HM LGS5 |
|---|---|---|---|---|---|
| DP7+ | 5 | 11 | 1 | 0 | 18 |
| DP6 | 4 | 9 | 3 | 4 | 10 |
| DP5 | 14 | 17 | 14 | 14 | 10 |
| DP4 | 23 | 14 | 29 | 24 | 12 |
| DP3 | 18 | 9 | 15 | 10 | 6 |
| Maltose | 2 | 1 | 3 | 0 | 1 |
| Glucose | 4 | 3 | 2 | 15 | 6 |
| Fructose | 30 | 36 | 33 | 33 | 37 |

Numbers represent percentages of total carbohydrates in the final product. Abbreviations: DP degree of polymerization By using in vitro digestibility assay described above, the relative glucose release rate as compared to starting sugar mixtures without enzyme treatment is shown below for the low-glycemic sweeteners (LGS), identified as LGS1 through LGS5. The results of the glucose release are reported in Table 3.3.

TABLE 3.3

| | | % glucose release | |
|---|---|---|---|
| Product | w/w sugar | Control | LGS |
| LGS1 | 3:2 suc:65 HM | 100 | 38 |
| LGS2 | 3:1 suc:65 HM | 100 | 19 |
| LGS3 | 3:2 suc:96 HM | 100 | 30 |
| LGS4 | 2:1 suc:96 HM | 100 | 17 |
| LGS5 | 7:2 suc:65 HM | 100 | 23 |

From the data in Tables 3.2 and 3.3, it is observed that the products of the present invention are sweet, having a fructose content ranging from 30 to 37 weight %, and that the products of the present invention are characterized by having reduced glucose release rate compared to products produced in the absence of the reaction with the enzyme. Thus, the products of the present invention are expected to have a lower glycemic index.

Study 3

In this example, there were provided two products from blends of sucrose and corn syrup solids containing 96 weight % maltose in the ratio of 3:2, sucrose to corn syrup solids.

Enzymes were obtained from LM strains NRRL-B-523 and NRRL-B-742 using the procedures provided above. The enzyme reaction was carried out using the same procedure as described in Studies 1, with the exceptions that the enzymes differ and the blend of sucrose and acceptor differ from that used in Example 1.

The carbohydrate profile of the resulting two (2) low-glycemic sweeteners are reported in Table 3.4.

TABLE 3.4

|  | B-523 | B-742 |
|---|---|---|
| DP5 | 1 | 1 |
| DP4 | 5 | 5 |
| DP3 | 24 | 30 |
| Maltose | 23 | 18 |
| Glucose | 19 | 15 |
| Fructose | 29 | 29 |

Numbers represent percentages of total carbohydrates in the final product. Abbreviations: DP = degree of polymerization With respect to the two (2) low-glycemic sweeteners of Example 3, in vitro digestibility assays described above, were carried out to compare the percent glucose that was released in the enzyme treated low-glycemic sweetener with the percent glucose released in the starting blend of sucrose and corn syrup solids containing 96 weight percent maltose that has not been reacted with the enzyme. It was determined that the in vitro digestibility showed a glucose release rate of 41% for the product prepared using the strain LM NRRL-B-523 enzyme, and 40% for the product prepared using the strain LM NRRL-B-742 enzyme, as compared to the control syrup solids blend without enzyme treatment, where the glucose release is 100%.

Therefore, it is apparent that the products of Example 3 are estimated to have a lower glycemic index than that of the starting blend of sucrose and corn syrup solids. It is expected that the products of Example 3 will be useful in the preparation of food and beverage compositions having low glycemic index.

Example 4

In Vitro Studies Using Rat Intestinal Powder

The results provided in this example are derived from in vitro digestibility assays using rat intestinal powder available from Sigma/Aldrich, Saint Louis, Mo., Catalog Number I-1630). In each reaction, 2% by weight of total carbohydrate was mixed with 1.25 weight % of rat intestinal powder in 0.025M phosphate buffer, at pH of 6.5 and incubated at 37° C. for up to 12 hours. Free glucose concentration in the reaction mixture was analyzed over time by the HPLC method described above.

Low-glycemic sweeteners were made using enzyme preparations from LM NRRL-B-21297, as described above. The resulting reaction products have sucrose to maltose weight ratios of 1:1, 1.5:1, 2.33:1, 4:1, 9:1, and 19:1. The reaction products were tested in the in vitro digestibility assay described above, which used rat intestinal powder. The results of the evaluation are reported below in Table 4.0.

TABLE 4.0

| Example NO. | Sucrose/Maltose | % Theoretical Glucose 0 hr | % Theoretical Glucose 4 hrs | % Theoretical Glucose 8 hrs | % Theoretical Glucose 12 hrs |
|---|---|---|---|---|---|
| 1 | 1:1 | 1.32 | 65.20 | 82.20 | 88.00 |
| 2 | 1.5:1 | 1.73 | 66.25 | 86.00 | 90.75 |
| 3 | 2.33:1 | 1.80 | 45.27 | 58.89 | 65.59 |
| 4 | 4:1 | 2.15 | 33.50 | 46.00 | 50.75 |
| 5 | 9:1 | 2.73 | 23.22 | 30.60 | 29.78 |
| 6 | 19:1 | 4.00 | 24.00 | 28.57 | 24.86 |

As a comparison, maltose is 88% digested in 4 hours using this method of assay.

In Table 4.0, the free glucose concentration in the reaction mixture was analyzed over time by the HPLC method described herein. The results in Table 7 show that the higher the sucrose to maltose weight ratio, the lower is the digestibility. From the data, it appears that the digestibility value reaches a plateau when the sucrose to maltose weight ratio is 9:1 and greater. It is furthermore reasonable to assume, from the data in Table 7, that the sucrose/maltose reaction products are low-glycemic sweeteners.

Example 5

In Vivo Studies of Glycemic Response to Low-Glycemic Sweeteners in Humans

Samples were initially tested to determine their carbohydrate profile, prior to determining their in vivo glycemic effect. The control in the human trial was 42 high fructose corn syrup (HFCS). The low-glycemic sweeteners used were produced using enzymes isolated from LM NRRL-B-21297 in reactions with sucrose and maltose in ratios of 9:1 and 4:1 (LGS 9:1 and LGS 4:1).

Study 1—Carbohydrate Profile

The carbohydrate profiles were generated using the methods described above. The results are shown in Table. 5.0.

TABLE 5.0

| | Sweetener composition for in vivo study | | |
|---|---|---|---|
| | 42 HFCS | LGS 4:1 | LGS 9:1 |
| DP12+ | | 4.1 | 6.9 |
| DP12 | | 1.7 | 3.9 |
| DP11 | | 4 | 7.9 |
| DP10 | | 4.7 | 5.5 |
| DP9 | | 6.3 | 9.8 |
| DP8 | | 5.22 | 4.9 |
| DP7 | | 6.5 | 5.9 |
| DP6 | | 4.3 | 2.9 |
| DP5 | | 4.7 | 1.4 |
| DP4 | 1 (DP4+) | 4.2 | 0.7 |
| DP3 | 1 | 6.4 | 1.1 |
| DP2 | 2.9 | 5.2 | 1.9 |
| DP1 | 51.5 | 6.2 | 9.5 |
| Fructose | 43.6 | 36.5 | 37.8 |

Numbers represent percentages of total carbohydrates in the final product. Abbreviations: DP = degree of polymerization Study 2—In Vivo Assay The method of testing the glycemic index provided in Wolever, et al. *Nutrition Research* 23:621-629, 2003, which is herein incorporated by reference, was used in the following study. More specifically, three different samples where prepared for evaluation by 10 healthy human subjects. The first sample is a drink comprising 50 grams on dry weight basis, of the low glycemic sweetener having a sucrose to maltose weight ratio of 9:1, and 200 grams water.

The second sample is a drink comprising 50 grams, on dry weight basis, of the low glycemic sweetener having a sucrose to maltose weight ratio of 4:1, and 200 grams of water.

The third sample is a drink comprising 50 grams, on dry weight basis of 42 high fructose corn syrup that contains 42% fructose and 200 grams water.

Each of the three (3) drinks were consumed by 10 human subjects, on three (3) separate times.

The drinks containing the low-glycemic sweetener were found to produce a smaller rise in blood glucose response when compared to the drinks containing 42 high fructose corn syrup as a sweetener. More particularly, assuming a rise in blood glucose value (area under the curve) of 100% for the drink containing the 42 high fructose corn syrup used as the control, the value resulting from the drink containing the low-glycemic sweetener having a sucrose to maltose weight ratio of 4:1 is 89% of the control, and the value resulting from the drink containing the low-glycemic sweetener having a sucrose to maltose weight ratio of 9:1 is 55% of the control. These results, indicate that the low-glycemic sweetener described herein; having the weight ratios of 4:1 and 9:1 are low glycemic index products. Moreover, the data indicates that the low-glycemic sweetener having a weight ratio of 9:1 is a more effective in lowering the glycemic index of a food product, than the low-glycemic sweetener having a weight ratio of 4:1.

Example 6

Low-Glycemic Sweeteners Produced from Other LM Strains

The following LM strains were obtained from the Agricultural Research Service Culture Collection (USDA) NRRL-B: 1121, 1143, 1149, 1254, 1297, 1298, 1374, 1375, 1377, 1399, 1402, 1433, 23185, 23186, 23188, and 23311. Fifty-milliliter cultures were grown using LM media (which is the media described in Example 1, except HyPep and Hy-yest are replaced by 0.15% polypeptone, 0.15% beef extract and 0.15% yeast extract) supplemented with sucrose and maltose (4% total sugar) at a 2 to 1 ratio. Cultures were grown at 32° C. with agitation for 20 h. Sugar profiles were identified by HPLC, as previously described. Specific strains were further grown as 1 L cultures using the same media and cells were harvested by centrifugation. The remaining supernatants were passed through a 50 K molecular weight cut-off filtration unit to generate a concentrated enzyme preparation (7-10× concentrate). Enzyme preparations were used to produce low-glycemic sweeteners (5% total sugar at 9:1 sucrose to maltose) and in vitro digestibility assays were performed as previously described.

The enzymes were prepared using the methods described above and 9:1 sucrose to acceptor ratios, except for the 1254 strain noted.

TABLE 6.0

|  | 21297 | 1121 | 1254 | 1254–5:1* | 1298 | 1374 | 1375 |
|---|---|---|---|---|---|---|---|
| polymer | 5.68 | 3.27 | 0 | 0 | 0.97 | 0 | 0 |
| DP14+ | 0 | 1.07 | 0 | 0 | 4.54 | 0 | 0 |
| DP13 | 0 | 0.01 | 0 | 0 | 0.08 | 0 | 0 |
| DP12 | 0 | 0 | 0 | 0 | 0 | 0 | 0 |
| DP11 | 6.41 | 0.01 | 0 | 0 | 0 | 0 | 0.07 |
| DP10 | 3.06 | 0.08 | 0 | 0 | 0 | 0.80 | 0.14 |
| DP9 | 8.44 | 0.54 | 0.13 | 0.1 | 0.01 | 0.73 | 0.24 |
| DP8 | 6.59 | 0 | 0.23 | 0.18 | 0.1 | 1.1 | 0.64 |
| DP7 | 9.94 | 1.83 | 0.75 | 0.68 | 0.5 | 1.95 | 2.50 |
| DP6 | 7.51 | 7.21 | 2.49 | 2.56 | 2.16 | 4.41 | 0.00 |
| DP5 | 5.97 | 11.44 | 7.38 | 8.44 | 4.91 | 8.26 | 7.92 |
| DP4 | 2.33 | 9.88 | 10.93 | 14.79 | 6.15 | 8.99 | 13.85 |
| DP3 | 2.37 | 6.61 | 8.47 | 12.36 | 6.72 | 3.49 | 5.60 |
| DP2 | 0.09 | 2.78 | 1.07 | 0.83 | 4.36 | 0.95 | 0.58 |
| DP1 | 2.87 | 16.33 | 14.49 | 10.12 | 21.8 | 3.32 | 11.1 |
| FRU | 38.22 | 38.86 | 39.49 | 39.85 | 47.61 | 37.3 | 33.38 |

|  | 1377 | 1402 | 23185 | 23186 | 23188 | 23311 |
|---|---|---|---|---|---|---|
| polymer | 0 | 12.27 | 14.97 | 40.85 | 30.78 | 22.26 |
| DP14+ | 0 | 2.80 | 9.30 | 0 | 8.05 | 9.73 |
| DP13 | 0 | 0 | 2.03 | 0.35 | 0 | 0 |
| DP12 | 0.33 | 6.44 | 0 | 0.62 | 0 | 3.25 |
| DP11 | 0 | 5.01 | 0.58 | 0.09 | 1.08 | 2.51 |
| DP10 | 0.27 | 2.79 | 0.71 | 0.43 | 1.19 | 3.00 |
| DP9 | 0.39 | 2.76 | 0.83 | 0 | 0 | 0 |
| DP8 | 0.83 | 0 | 0 | 0.67 | 2.11 | 3.31 |
| DP7 | 1.85 | 3.28 | 1.23 | 1.27 | 2.93 | 3.65 |
| DP6 | 4.21 | 4.93 | 2.50 | 1.87 | 3.18 | 3.22 |
| DP5 | 6.46 | 7.55 | 4.92 | 4.08 | 4.48 | 4.25 |
| DP4 | 7.78 | 6.18 | 6.17 | 4.58 | 4.23 | 3.24 |
| DP3 | 3.63 | 3.00 | 2.53 | 4.22 | 2.91 | 3.00 |
| DP2 | 1.96 | 2.15 | 0.04 | 0.57 | 0.87 | 0.38 |
| DP1 | 18.75 | 0.91 | 5.34 | 2.53 | 1.50 | 2.18 |
| FRU | 37.61 | 39.89 | 47.92 | 36.99 | 36.66 | 35.68 |

Table 1. Summary of sugar profiles of syrups generated by concentrated Leuconostoc cell-free extracts with 5% sucrose and maltose at a 9:1 ratio.
Values are % of total sugar in syrups. Bold headings are strain numbers. DP = degree of polymerization (glucose units). FRU = fructose
* = used 5:1 sucrose to maltose.

To get an estimate of the glycemic index values of the newly generated syrups, in vitro digestibility values of selected syrups were determined using the previously described rat intestinal powder assay (Table 6.1).

TABLE 6.1

| T8 - % glucose release | |
|---|---|
| Maltose | 92.35 |
| 21297 | 14.90 |
| 1402 | 25.26 |
| 23185 | 19.83 |
| 23186 | 14.72 |
| 23188 | 17.40 |
| 23311 | 17.58 |

By directly correlating the percent glucose released in digestibility assays to glycemic index, it is expected that syrups generated by some of the other strains will have glycemic index (GI) values (for a given sucrose:acceptor ratio) similar to syrups generated by strain NRRL-B-21297.

Example 7

Various Food Products Made Using Low-Glycemic Sweeteners

The following are specific examples of food products or food compositions that may be prepared, utilizing the low-glycemic sweeteners described herein.

1. Meal Replacement Bar

The control bar contained 18.7% soy protein isolate, 33.6% high fructose corn syrup (55 HFCS, 77% dry solid), 26.7% high maltose corn syrup (65% maltose, 80% dry solid), 5.4% maltodextrin, 1.4% novagel, 5% vitamin/mineral mix, 0.6% salt, 7.9% honey and 0.7% key lime flavor. The low glycemic bar contained 18.7% soy protein isolate, 64.5% low-glycemic sweetener (made with 9:1 ration of sucrose to maltose, at 80% dry solid), 1.2% water, 1.4% novagel, 5% vitamin/mineral mix, 0.6% salt, 7.9% honey, and 0.7% key lime flavor. The glycemic index of this low glycemic bar was calculated to be 49% lower than the control bar. The low glycemic bar was additionally tasted and found to have a taste similar to that of the control.

2. Meal Replacement Beverage

The control beverage contains 54.9% skim milk, 10% cold water, 0.4% cellulose, 0.01% carageenan, 1% soy protein concentrate, 1% maltodextrin, 0.49% cocoa powder, 0.18% trisodium citrate, 0.06% salt, 6% high fructose corn syrup (42HFCS, 71% dry solid), 2% high fructose corn syrup (55HFCS, 77% dry solid), 2% high maltose corn syrup (65% maltose, 80% dry solid), 1% corn syrup solids, 0.1% canola oil, 0.1% cinnamon, 0.1% chocolate flavor, 0.1% vanilla, 0.05% cooked milk flavor. The low glycemic beverage has 12% low-glycemic sweetener (made with 9:1 ratio of sucrose and maltose, at 80% dry solid), 54.9% skim milk, 10% cold water, 0.4% cellulose, 0.01% carageenan, 1% soy protein concentrate, 0.49% cocoa powder, 0.18% trisodium citrate, 0.06% salt, 0.1% canola oil, 0.1% cinnamon, 0.1% chocolate flavor, 0.1% vanilla, 0.05% cooked milk flavor. The low glycemic beverage has a 36% reduction in calculated glycemic index as compared to control beverage.

3. Raspberry Jam

The control jam had 39.1% fruit, 32.1% corn syrup (43DE, 80% dry solid), 13% sugar, 0.5% pectin, 2.6% water, 11.7% high fructose corn syrup (42HFCS, 71% dry solid), 0.2% potassium sorbate, 0.2% sodium benzoate, 0.6% citric acid solution (50%). The low glycemic jam contained 28.1% fruit, 57.9% low-glycemic sweetener (made with 9:1 ratio of sucrose and maltose, at 80% dry solid), 0.5% pectin, 2.5% water, 0.2% potassium sorbate, 0.2% sodium benzoate, 0.6% citric acid solution. The low glycemic jam has a 60% reduction in calculated glycemic index as compared to the control jam.

4. Ice Cream

The control ice cream contains 12% fat, 10% milk solid, 13% sucrose, 5% corn syrup (36DE, 80% dry solid), and 0.35% stabilizer. The low glycemic ice cream has 12% fat, 10% milk solid, 5% sucrose, 13% low-glycemic sweetener (made with 9:1 ratio of sucrose and maltose, at 80% dry solid), and 0.35% stabilizer. The low glycemic ice cream has a 35% reduction in calculated glycemic index as compared to the control.

5. Gummy Candy

The control gummy candy has 21.6% water, 5.4% gelatin, 49% corn syrup (63DE, 80% dry solid), 24% sugar. The low glycemic gummy candy has 21.6% water, 5.4% gelatin, and 58% low-glycemic sweetener (made with 9:1 ratio of sucrose and maltose, at 80% dry solid). The low glycemic candy has a 59% reduction in calculated glycemic index as compared to control.

6. Caramels

The control caramel has 37% sweetened condensed whole milk, 21% sugar, 14.1% butter, 26.9% corn syrup (62DE, 80% dry solid), 0.76% emulsifier, 0.1% salt, 0.1% sodium bicarbonate, 0.04% vanillin. The low glycemic caramel has 35.5% sweetened condensed whole milk, 51% low-glycemic sweetener (made with 9:1 ratio of sucrose and maltose, at 80% dry solid), 13.5% butter, 0.76% GMS, 0.1% salt, 0.1% sodium bicarbonate, 0.04% vanillin. The low glycemic caramel has a 42% reduction in calculated glycemic index as the control.

7. Low Fat Yogurt

The control yogurt has 91% milk (2%), 5% sugar, 2% starch, 1% whey protein concentrate, and 1% milk solids (non fat). The low glycemic yogurt contains 89.5% milk (2%), 8.5% low-glycemic sweetener (made with 9:1 ratio of sucrose and maltose, at 80% dry solid), 1% whey protein concentrate, and 1% milk solids (non fat). The low glycemic yogurt has a 37% reduction in calculated glycemic index as compared to the control.

8. Maple Flavored Syrup

The control maple syrup contains 59.2% high fructose corn syrup (42HFCS, 71% dry solid), 34.7% corn syrup (43DE, 81% dry solid), 5.2% water, 0.85% maple flavor, and 0.05% potassium sorbate. The low glycemic maple sweetener has 87.5% low-glycemic sweetener (made with 9:1 ratio of sucrose and maltose, at 80% dry solid), 11.15% water, 0.85% maple flavor and 0.05% potassium sorbate. The low glycemic maple syrup has a 54% reduction in calculated glycemic index as compared to control.

9. Ketchup

The control ketchup has 39.4% tomato paste, 24.3% water 16.6% high fructose corn syrup (42HFCS, 71% dry solid), 9% corn syrup (63 DE, 80% dry solid), 8.7% vinegar, 1.9% salt, 0.15% onion powder, and 0.03% garlic powder. The low glycemic ketchup contains 39.4% tomato paste, 26.1% water, 23.7% low-glycemic sweetener (made with 9:1 ratio of sucrose and maltose, at 80% dry solid), 8.7% vinegar, 1.9% salt, 0.15% onion powder, and 0.03% garlic powder. The low glycemic ketchup has a 46% reduction in calculated glycemic index.

10. Still Beverage (Sports Beverage Type)

The beverage control was prepared by dissolving and/or mixing 85.30 g/L of Cargill IsoClear High Fructose Corn Syrup 42, 2.0 g/L of Citric Acid, 0.35 g/L of Potassium Citrate, 0.58 g/L of Sodium Chloride, 0.05 g/L of DiPotassium Phosphate, 0.45 ml/L of Red Cabbage Extract (Warner Jankinson, WJ03813), 1.50 ml/L of Natural Punch Flavor and water to bring to the volume. The beverage then pasteurized at 190-195° F. for 2 minutes and hot-filled to glass bottles before the containers are sealed. The low glycemic beverage was made the same as control except Cargill IsoClear HFCS-42 was replaced with 76.10 g/L of Cargill Llow-Glycemic sweetener (made with 9:1 ratio of sucrose and maltose, at 80% dry solid). Everything else remained the same. The calculated glycemic index of the low glycemic beverage is 45% lower than the control.

11. Chocolate Chip Cookies

The control cookies are made of 31.6% flour, 23.7% sugar, 18.9% shortening, 2.2% egg solids, 5.4% water, 0.4% salt, 0.2% sodium bicarbonate, 0.3% flavor, and 17.4% chocolate chips. The low glycemic cookies contain 31.4% flour, 29.4% low-glycemic sweetener (made with 9:1 ratio of sucrose and maltose, at 80% dry solid), 18.8% shortening, 2.2% egg solids, 0.4% salt, 0.2% sodium bicarbonate, 0.3% flavor, and 17.3% chocolate chips. The low glycemic cookies have a 16% reduction in calculated glycemic index as compared to the control.

This invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated hereby by reference for any disclosure pertinent to the practice of this invention.

What is claimed is:

1. A process for preparing a low-glycemic sweetener comprising combining sucrose, an acceptor molecule that is a sugar alcohol having free hydroxyl groups at one or more of carbon positions numbers 2, 3 and 6 that can accept a glucose unit from sucrose, and a glucansucrase enzyme so as to prepare a low-glycemic sweetener having at least 20% alpha 1-3 linkages and at least 20% alpha 1-6 linkages, wherein the ratio of sucrose to acceptor molecule is at least 8:1.

2. The process of claim 1, wherein the ratio of sucrose to acceptor molecule is at least 9:1.

3. The process of claim 2, wherein the ratio of sucrose to acceptor molecule is at least 10:1.

4. The process of claim 1, wherein the acceptor molecule is maltose.

5. The process of claim 1, further comprising removing fructose from the sweetener.

6. The process of claim 5, wherein the sweetener contains less than 50% fructose.

7. The process of claim 1, wherein the glucansucrase enzyme is obtained from lactic acid bacteria.

8. The process of claim 1, wherein the glucansucrase enzyme is obtained from *Leuconostoc mesenteroides*.

9. The process of claim 8, wherein the glucansucrase enzyme is obtained from *Leuconostoc mesenteroides* strains NRRL B 1355, 23185, 23186, 23188, 23311, 742, or 21297.

10. The process of claim 9, wherein the strain is *Leuconostoc mesenteroides* NRRL B 21297.

11. A low-glycemic sweetener prepared according to the process of claim 1.

12. A food comprising the low-glycemic sweetener of claim 11.

13. A beverage comprising the low-glycemic sweetener of claim 11.

14. A process for reducing the glycemic index of a food or beverage composition comprising incorporating into the food or beverage composition the low-glycemic sweetener of claim 11.

15. A process for preparing a low-glycemic sweetener comprising combining sucrose, an acceptor molecule that is a sugar or a sugar alcohol having free hydroxyl groups at one or more of carbon positions numbers 2, 3, and 6 that can accept a glucose unit from sucrose, and a glucansucrase enzyme so as to prepare a low-glycemic sweetener having at least 20% alpha 1-3 linkages and at least 20% alpha 1-6 linkages, wherein the ratio of sucrose to acceptor molecule is in the range of from 8:1 to 19:1.

16. The process of claim 15, wherein the acceptor molecule is maltose.

17. The process of claim 15, wherein the glucansucrase enzyme is obtained from *Leuconostoc mesenteroides* strains NRRL B 1355, 23185, 23186, 23188, 23311, 742, or 21297.

18. The process of claim 17, wherein the strain is *Leuconostoc mesenteroides* NRRL B 21297.

19. A low-glycemic sweetener prepared according to the process of claim 15.

20. A food or beverage comprising the low-glycemic sweetener of claim 19.

* * * * *